Nov. 20, 1934.　　　　F. PRUSA　　　　1,981,325
SINGLE WHEEL AXLE
Filed March 19, 1934　　3 Sheets-Sheet 3
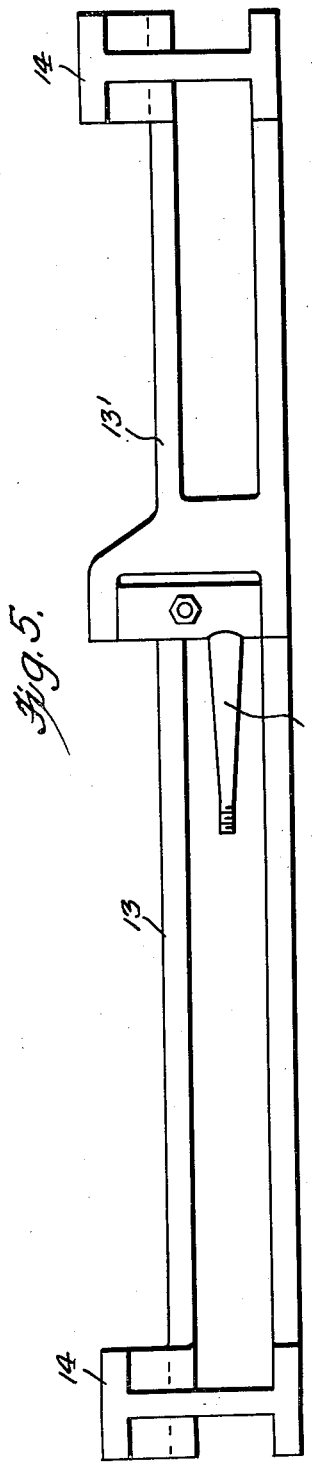
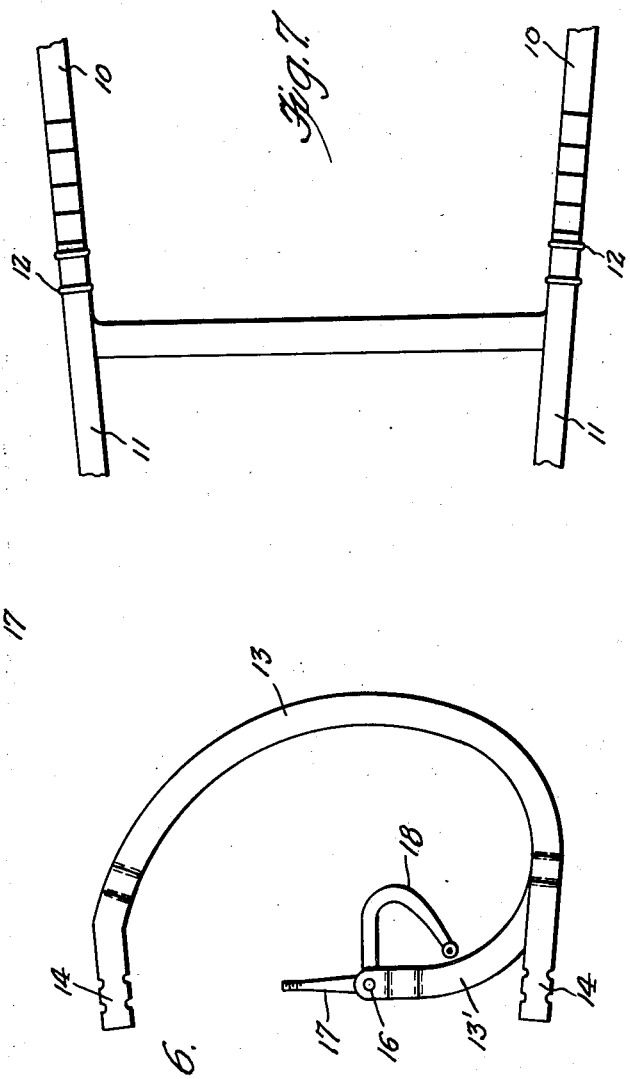
Inventor
*Frank Prusa,*
By *Clarence A. O'Brien*
Attorney Patented Nov. 20, 1934

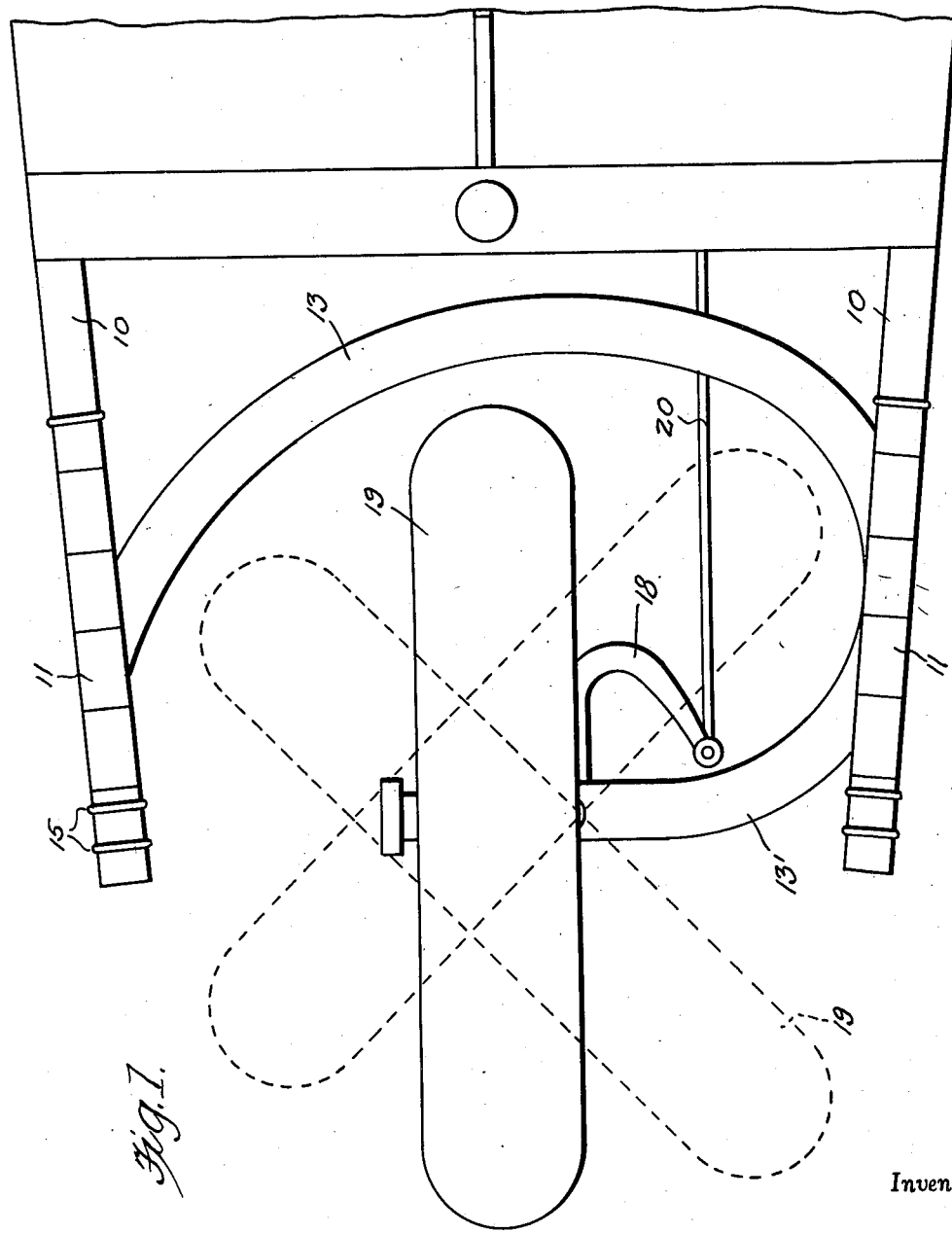

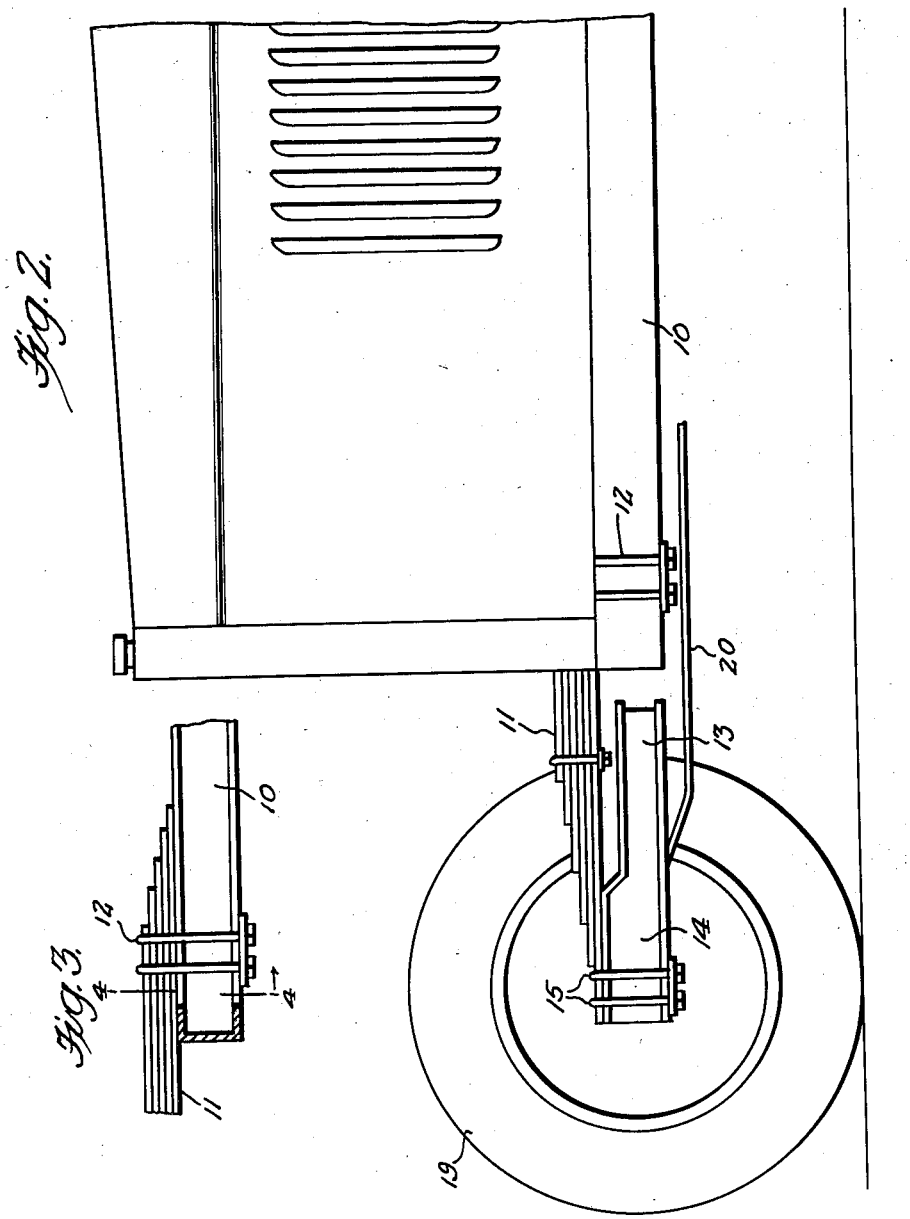

1,981,325

UNITED STATES PATENT OFFICE 1,981,325

SINGLE WHEEL AXLE

Frank Prusa, Congress Park, Ill.

Application March 19, 1934, Serial No. 716,397

2 Claims. (Cl. 301—124)

This invention has reference to improvements in axles and the object of the invention is to provide means whereby but a single wheel is required for supporting the front of a motor driven vehicle, as for example an automobile or the like.

An object of the invention is to provide an improved axle for supporting a wheel in a manner to permit of the use of a single vehicle wheel at the front end of an automobile.

A still further object of the invention is to provide improved means for supporting the axle from the chassis of the automobile.

Other objects and advantages of the invention will be apparent from a study of the following description taken in connection with the accompanying drawings wherein:

Figure 1 is a top plan view illustrating the application of the invention.

Figure 2 is a side elevational view thereof.

Figure 3 is a fragmentary sectional, elevational view showing the manner of securing the leaf spring provided for the axle to a chassis bar.

Figure 4 is a sectional view taken substantially on the line 4—4 of Figure 3.

Figure 5 is a front elevational view of the axle.

Figure 6 is a plan view thereof, and

Figure 7 is a plan view of the chassis of the automobile showing the springs associated therewith.

Referring to the drawings by reference numerals it will be seen that 10—10 indicate the forward ends of the chassis bars of an automobile, and in accordance with the present invention there are mounted on said ends of the chassis bars leaf springs 11. The leaf springs are secured to the chassis bars by U-bolts 12.

Supported by the leaf springs and extending between said springs, which latter, it will be noted converge toward their free ends, is my improved axle, the same being indicated generally by the reference numeral 13. The axle 13 may be formed of a section of an eye beam, and as clearly suggested in Figure 6 is substantially hyperboloidal in plan. At the ends thereof the axle 13 is suitably formed as at 14 for disposition against the under side of the lowermost leaves of the springs, and also formed to accommodate U-bolts 15 provided for securing the ends of the axle to the leaf springs.

Adjacent one end thereof the axle 13 has extending inwardly a curved arm 13' which is bifurcated to accommodate shaft 16 of the usual wheel spindle 17. The single tread wheel 19 is suitably mounted on the spindle 17 for supporting the front end of the automobile. The spindle is also provided with the usual steering link or arm 18 which is connected in the usual manner with the steering rod 20 of the automobile.

It will be apparent that with this arrangement the wheel 19 is disposed substantially in line with the longitudinal median of the automobile and will serve to adequately support the front end thereof. Obviously through the medium of the usual steering mechanism the wheel 19 may be turned either to the right or left for guiding the automobile.

In actual practice it will be found that with this invention there will be less air resistance, while greater protection is offered for the crank case, especially when driving over rugged or dirt roads. Also, in the event of a "blow-out" there will be little or no likelihood of the vehicle swerving off of the road. As also thought apparent the wheel, or its tire may be easily removed while a great saving will be effected in the construction in view of the fact that fenders now usually provided for the front wheels of an automobile may be dispensed with.

Also with this invention access may be had more readily to the motor, road shock will be reduced to a minimum, and the invention may be readily applied to an automobile without any material change in the structure or style of automobile body.

Having thus described my invention, what I claim as new is:

1. An axle for motor vehicle comprising a member of hyperboloidal form having an arm extending inwardly towards the center thereof, and means on said end of the arm for supporting a wheel.

2. An axle for motor vehicle comprising a member of hyperboloidal form having an arm extending inwardly toward the longitudinal center thereof, a spindle mounted on said arm for rotative movement on a vertical axis, a wheel supported by said spindle and means for affecting a rotative movement out of said spindle on its vertical axis.

FRANK PRUSA.